US008406973B2

(12) United States Patent
Masuda et al.

(10) Patent No.: US 8,406,973 B2

(45) Date of Patent: Mar. 26, 2013

(54) DRIVING FORCE CONTROL UNIT FOR VEHICLE

(75) Inventors: Toshio Masuda, Tokyo (JP); Kenichi Yamamoto, Tokyo (JP); Kenji Hijikata, Tokyo (JP); Satoshi Satomura, Tokyo (JP); Hiroshi Oishi, Tokyo (JP); Toyohide Sunaguchi, Tokyo (JP); Yoshio Iwakami, Tokyo (JP); Munenori Homma, Tokyo (JP); Atsushi Atake, Tokyo (JP); Kouji Kaneda, Tokyo (JP); Tatsuru Fukuda, Tokyo (JP); Minoru Yuki, Tokyo (JP); Masayuki Ushiki, Tokyo (JP); Tsuyoshi Kobayashi, Tokyo (JP); Masahito Motoi, Tokyo (JP); Naoki Shibata, Tokyo (JP); Hiroshi Ogiwara, Tokyo (JP); Katsumasa Igarashi, Tokyo (JP); Junzo Shinozuka, Tokyo (JP); Akihisa Nakamura, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 422 days.

(21) Appl. No.: 11/783,269

(22) Filed: Apr. 6, 2007

(65) Prior Publication Data

US 2008/0162012 A1 Jul. 3, 2008

(30) Foreign Application Priority Data

Apr. 7, 2006 (JP) ................................ 2006-106146
May 19, 2006 (JP) ................................ 2006-140752

(51) Int. Cl.
*H02P 9/06* (2006.01)

(52) U.S. Cl. ............ 701/56; 701/110; 477/20; 477/115

(58) Field of Classification Search .................... 701/54, 701/55, 56, 101, 110, 51, 99; 477/3, 7, 14, 477/15, 17, 18, 20, 34, 43, 79, 80, 89–91, 477/107, 115, 120; 340/425.5, 438, 439, 340/441; 345/7
See application file for complete search history.

(56) References Cited

U.S. PATENT DOCUMENTS 4,669,335 A * 6/1987 Matsuoka et al. ............ 477/129
(Continued)

FOREIGN PATENT DOCUMENTS

DE 198 11 244 A1 9/1998
DE 199 63 156 B4 4/2004
(Continued)

OTHER PUBLICATIONS

JP 2000-087772 Translation.*

(Continued)

*Primary Examiner* — Thomas Black
*Assistant Examiner* — Ce Li
(74) *Attorney, Agent, or Firm* — McGinn IP Law Group, PLLC

(57) ABSTRACT

The present invention provides a driving force control unit for a vehicle having an accelerator opening degree detecting unit for detecting accelerator opening degree, a driving condition detecting unit for detecting engine driving condition, a driving force setting unit for setting a driving force indication value according to a plurality of different driving force characteristics based on the accelerator opening degree and the engine driving condition, a selector for selecting a driving force characteristic from the plural of different driving force characteristics by manipulation. The driving force setting unit setting the driving force indication value according to the selected driving force characteristic.

19 Claims, 11 Drawing Sheets

U.S. PATENT DOCUMENTS

| | | | | |
|---|---|---|---|---|
| 5,230,256 | A * | 7/1993 | Oizumi et al. | 477/127 |
| 5,247,859 | A * | 9/1993 | Agusa et al. | 477/129 |
| 5,309,139 | A * | 5/1994 | Austin | 340/462 |
| 5,337,339 | A * | 8/1994 | Hillstrom | 377/52 |
| 5,841,201 | A * | 11/1998 | Tabata et al. | 290/40 C |
| 5,941,793 | A * | 8/1999 | Ito et al. | 477/120 |
| 6,354,266 | B1 * | 3/2002 | Cornell et al. | 123/322 |
| 7,124,012 | B2 | 10/2006 | Feder et al. | |
| 7,540,344 | B2 | 6/2009 | Yamamoto et al. | |
| 2003/0079698 | A1 * | 5/2003 | Morgan et al. | 123/41.1 |
| 2004/0023755 | A1 * | 2/2004 | Nozaki | 477/45 |
| 2007/0149350 | A1 * | 6/2007 | Anderson et al. | 477/54 |

FOREIGN PATENT DOCUMENTS

| | | |
|---|---|---|
| DE | 10 2004 022 554 B3 | 11/2005 |
| JP | 2000-087772(A) | 3/2000 |
| JP | 2003-211996 | 7/2003 |
| JP | 2004-196055(A) | 7/2004 |
| JP | 2005-188384 | 7/2005 |
| JP | 2005-249098 A | 9/2005 |
| JP | 2005-315171(A) | 11/2005 |
| JP | 2005-335702(A) | 12/2005 |
| JP | 2006-063959(A) | 3/2006 |
| JP | 2006-074931(A) | 3/2006 |

OTHER PUBLICATIONS

JP 2003-211996 Translation.*

JP 2005-188384 Translation.*

JP 2000-087772 A Translation.*

DE 19963156 A Translation.*

Japanese Office Action dated Aug. 1, 2006.

German Office Action dated Jun. 2, 2010 with English translation thereof.

Winterkorn M., Bohne P.: Das Drei-Liter-Auto von Volkswagen—der Lupo 3L TDI ( The Three-Litre-Engine Vehicle of Volkswagen, The Model Lupo 3L TDI), ATZ 101, vol. 6, 1999, pp. 309-401.

Japanese Office Action dated Nov. 24, 2010.

Japanese Office Action dated Oct. 18, 2011 with partial English translation.

Japanese Office Action dated Aug. 30, 2011.

* cited by examiner

DRIVING FORCE CONTROL UNIT FOR VEHICLE

CROSS REFERENCE TO RELATED APPLICATIONS

The disclosures of Japanese Applications No. 2006-106146 filed on Apr. 7, 2006 and No. 2006-140752 filed on May 19, 2006 including the specification, drawings, and abstract is incorporated herein by reference in its entirety.

BACKGROUND OF THE INVENTION

1. Technical Field

The present invention relates to a driving force control unit for a vehicle which selects one driving force characteristic from a plurality of different driving force characteristics by outside operation (manipulation) and determines driving force based on the selected driving force characteristic.

2. Related Art

According to a so-called electronic control throttle type engine which electrically controls a throttle valve known in the art, an accelerator pedal and the throttle valve are not mechanically linked. Thus, the opening of the throttle valve (throttle opening) can be non-linearly controlled for the operating amount of the accelerator pedal (accelerator opening degree).

For example, a technology disclosed in JP-A-2005-188384 divides the driving condition of the engine into a plurality of driving ranges based on engine rotational speed and accelerator opening degree and creates a map for each of the driving ranges so as to control the opening of the throttle valve in accordance with the operation condition of the engine.

According to the technology disclosed in this reference, excellent driving performance is obtained by increasing potential to the maximum at the time of high-speed running, and driving with reduced power is attained when stopping and running are repeated in such cases as traffic congestion. Thus, excellent drivability can be achieved.

According to the technology shown in the above reference, an appropriate map is automatically selected for each of the driving ranges, and the throttle opening is controlled in accordance with the selected map. In this case, when a vehicle having a high-performance engine such as a turbo engine is running on an ordinary road, the driving range is shifted to a full acceleration range and extremely high acceleration performance is offered by a largest possible amount of operation of the accelerator pedal. Therefore, during running on the ordinary road, it is required that the operation amount of the accelerator pedal is continuously and finely adjusted, which increases nervousness of control over the acceleration.

When power for the engine is excessively reduced, sufficient acceleration is not obtained at the time of high-speed running or running on an upward slope. As a result, the driver feels insufficient power of the vehicle.

In addition, driving force characteristics of the vehicle desired by a driver who prefers economical driving with reduced power are different from those desired by a driver who prefers responsive driving achieving excellent acceleration and deceleration responses. Thus, in case that one vehicle is driven by different drivers having different preferences, it is difficult to provide driving control which satisfies the demands of both the drivers.

Accordingly, it is difficult for one vehicle to satisfy all the demands of the respective drivers, and typically a user selects and purchases a vehicle having a driving characteristic suitable for preference of the user. Since the driving characteristic cannot be changed after purchase, the economical aspect fails when a vehicle having high-power driving characteristic is selected. On the contrary, power is unsatisfactory when a vehicle having highly economical driving force characteristic is selected. It is therefore difficult to obtain both high-power driving characteristic and highly economic driving characteristic from one vehicle, which decreases usability of the vehicle.

SUMMARY OF THE INVENTION

Accordingly, it is an object of the invention to provide a driving force controller for a vehicle capable of not only increasing satisfaction of driving by achieving both economical and responsive driving, but also allowing selection of other driving force characteristics after purchase of the vehicle to increase usability of the vehicle.

The vehicle driving force control unit according to the first aspect of the invention includes an accelerator opening degree detecting unit for detecting accelerator opening degree; a driving condition detecting unit for detecting engine driving condition; a driving force setting unit for setting a driving force indication value according to a plurality of different driving force characteristics based on said accelerator opening degree and said engine driving condition; and a selector for selecting a driving force characteristic from said plural of different driving force characteristics by manipulation, said driving force setting unit setting said driving force indication value according to said selected driving force characteristic.

According to a second aspect of the invention, in the driving force control unit according to the first aspect of the invention, said driving force setting unit memorizes a plurality of mode maps, said each of mode maps having a different driving force indication value based on said accelerator pedal opening degree and said engine operating condition, said selector selects one mode map from said plurality of mode maps by manipulation, and said driving force setting unit sets said driving force according to said selected mode map.

According to a third aspect of the invention, in the driving force control unit according to the first aspect of the invention, the engine operating conditions includes engine rotational speed.

According to a fourth aspect of the invention, in the driving force control unit according to the second aspect of the invention, said driving force setting unit includes first and second mode maps, said first mode map has a normal driving characteristic suitable for normal driving, said second mode map has a suppressed driving force characteristic.

According to a fifth aspect of the invention, in the driving force control unit according to the second aspect of the invention, said driving force setting unit includes first, second and third mode maps, said first mode map has a normal driving characteristic suitable for normal driving, said second mode map has a suppressed driving force characteristic, and said third mode maps has a emphasizing driving force characteristic.

According to a sixth aspect of the invention, in the driving force control unit according to the second aspect of the invention, the driving force control unit further comprises a temporary change over switch for changing the mode map to another mode map temporarily.

According to seventh aspect of the invention, in the driving force control unit according to the second aspect of the invention, the driving force control unit further has a display provided to the instrument panel, said driving force setting unit controls said display so as to display a characteristic line for driving force and change said characteristic line according to the operation of the accelerator pedal.

According to this invention, the driver can select one driving force characteristic from a plurality of different driving force characteristics. That is, the vehicle's driving force characteristics may be changed corresponding to liking of the driver. The driver can select economic drive and zippy drive so that the driver can enjoy driving the car. Furthermore, the driver can select different driving force characteristic after purchase the car.

Accordingly, a plurality of drivers who have different favorites about the driving force characteristics can select favorite driving force each other in the same car so that the car is effectively used.

PREFERRED EMBODIMENTS OF THE INVENTION

Figure 1:
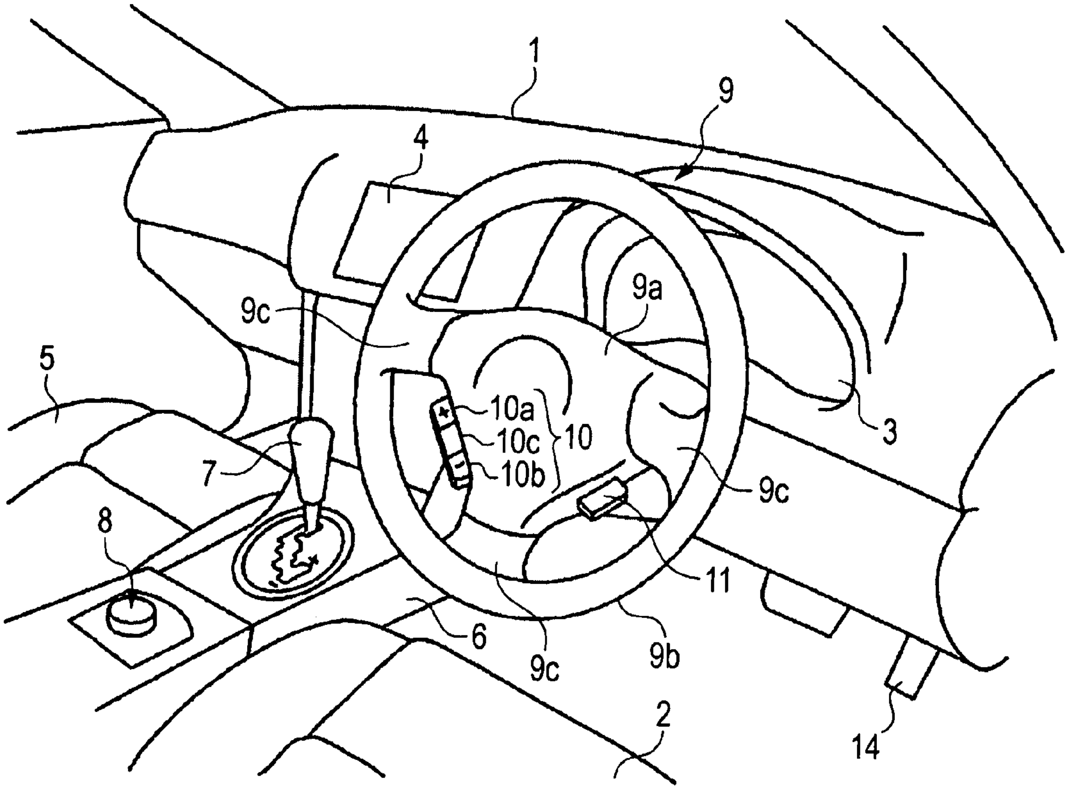
FIG. 1 is a perspective view of an instrument panel and a center console as viewed from a driver's seat side.

Hereinafter, one embodiment of the invention is explained in conjunction with drawings. FIG. 1 shows a perspective view of an instrument panel and a center console as viewed from a driver's seat side.

As shown in FIG. 1, the instrument panel 1 which is arranged in a front portion in the inside of a cabin of a vehicle extends laterally in the vehicle width direction, and a combination meter 3 is arranged on the instrument panel 1 which is positioned in front of a driver's seat 2. Further, at the substantially center of the instrument panel 1 in the vehicle width direction, a center display 4 which is used as a display means constituting a well-known car navigation system is arranged.

Further, on a center console 6 which is arranged between the driver's seat 2 and a passenger seat 5 and extends toward a rear side of a vehicle body from the instrument panel 1 side, a selection lever 7 which is used to select a range of an automatic transmission is arranged, and a mode selection switch 8 which is used as a selection means for selecting driving force characteristic of an engine is arranged behind the selection lever 7. Further, a steering wheel 9 is arranged in front of the driver's seat 2.

The steering wheel 9 includes a center pad portion 9*a* which houses an air bag or the like, and the center pad portion 9*a* and left, right and lower portions of a grip portion 9*b* which is arranged around the center pad portion 9*a* are connected with each other by way of 3 spokes 9*c*. A display changeover switch 10 which is used as a display changeover means is arranged on a left lower portion of the center pad portion 9*a*. Further, a temporarily changeover switch 11 which is used as a temporarily changeover means is arranged on a right lower portion of the center pad portion 9*a*.

Figure 2:
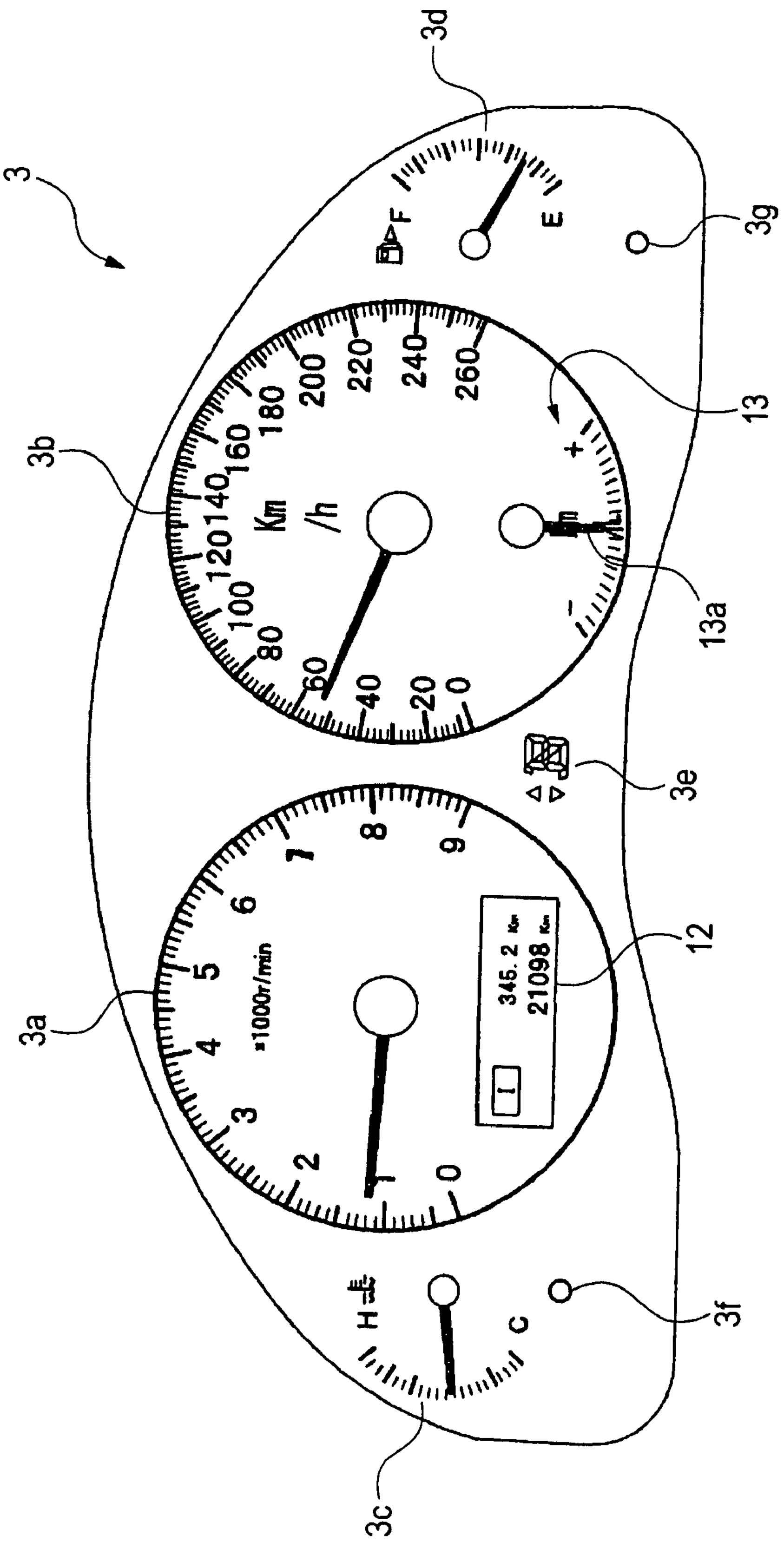
FIG. 2 is a front view of a combination meter.

Further, as shown in FIG. 2, on left and right sides of the combination meter 3 close to the center, a tachometer 3*a* which indicates an engine rotational speed and a speed meter 3*b* which indicates a vehicle speed are respectively arranged. Further, a water temperature meter 3*c* which indicates a cooling water temperature is arranged on the left side of the tachometer 3*a*, and a fuel level meter 3*d* which indicates residual fuel quantity is arranged on the right side of the speed meter 3*b*. Further, a gearshift position display portion 3*e* which indicates a current position of gearshift is arranged on a center portion of the combination meter 3. Here, symbol 3*f* indicates a warning lamp, and symbol 3*g* indicates a trip reset switch which resets a trip meter. A push button of the trip reset switch 3*g* projects toward the driver's seat 2 side from the combination meter 3, and the trip meter is reset when the driver or the like continuously turns on the trip reset switch 3*g* for a predetermined time or more by pushing the push button.

Further, on a lower portion of the tachometer 3*a*, a multi information display (hereinafter, abbreviated as "MID") 12 which is used as a display means for respectively displaying information such as mileage, fuel consumption, the engine driving force by changing over a plurality of display images is arranged. Further, on a lower portion of the speed meter 3*b*, a fuel consumption meter 13 which indicates a state of fuel efficiency based on the difference between the instantaneous fuel consumption and the trip average fuel consumption is arranged.

Figure 3:
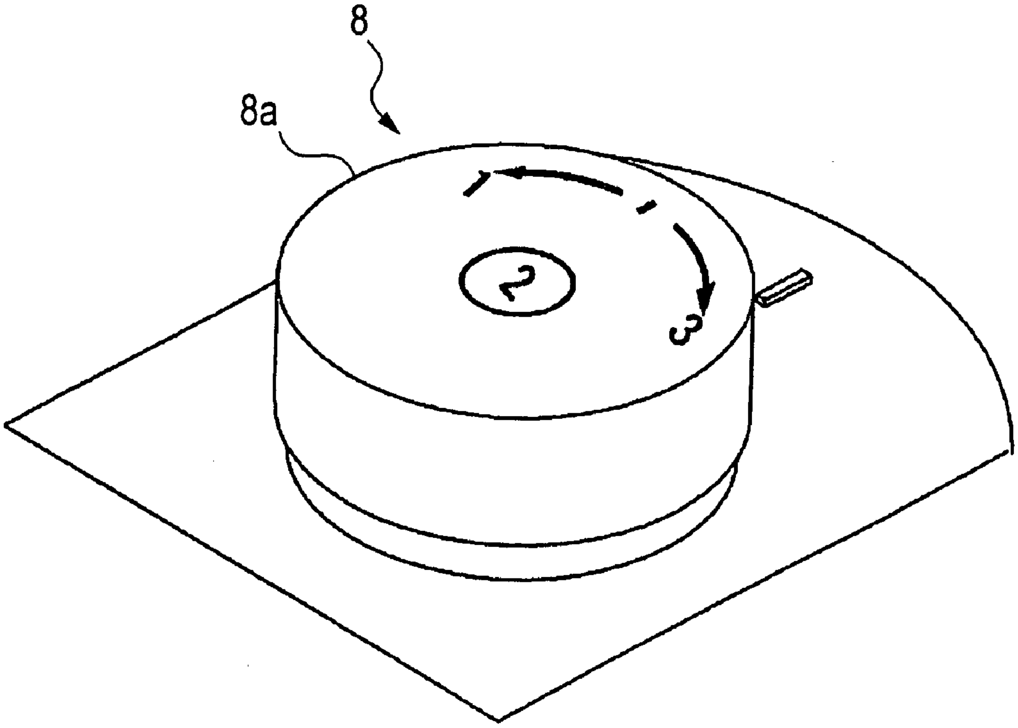
FIG. 3 is a perspective view of a mode selection switch.

Further, as shown in FIG. 3, the mode selection switch 8 is a shuttle switch which arranges a push switch parallel thereto. When an operator (since the operator is generally the driver, the explanation is made by referring the operator as "driver" hereinafter) manipulates a manipulation knob 8*a*, the driver can select three kinds of modes described later (a normal mode 1 which is a first mode, a save mode 2 which is a second mode, and a power mode 3 which is a third mode). That is, in this embodiment, by rotating the manipulation knob 8*a* in the left direction, a left switch is turned on and the normal mode 1 is selected. By rotating the manipulation knob 8*a* in the right direction, a right switch is turned on and the power mode 3 is selected. On the other hand, by pushing the manipulation knob 8*a* in the lower direction, the push switch is turned on and the save mode 2 is selected. Here, by allocating the save mode 2 to the push switch, even when the push switch is turned on erroneously during traveling, for example, the mode is just changed over to the save mode 2 where an output torque is suppressed as described later, hence there is no possibility that the driving force is acutely increased thus ensuring the safe driving of the driver.

Here, output characteristics of the respective modes 1 to 3 are briefly explained. The normal mode 1 is set such that an output torque is changed approximately linearly with respect to a operation amount of the accelerator pedal 14 (accelerator opening degree) (see FIG. 11A). The normal mode 1 is a mode which is suitable for normal driving.

Further, the save mode 2 is set as a mode in which by saving an engine torque alone or by saving an engine torque in synchronism with a lock-up control in case of an automatic transmission, smooth output characteristic is obtained while ensuring a sufficient output thus allowing a driver to enjoy the acceleration work. Further, in the save mode 2, the output torque is suppressed and hence, it is possible to achieve both of the easy drive ability and low fuel consumption (economical efficiency) in a well balanced manner. Further, for example, even in case of a vehicle with a 3 litter engine, the smooth output characteristic is obtained while ensuring a sufficient output corresponding to the 2 litter engine. Particularly, the easy-to-drive performance is achieved in a practical-use region such as traveling in towns.

The power mode 3 is set as a mode in which the output characteristics with an excellent response from a low speed region to a high speed region of the engine is achieved and, at the same time, in case of an automatic transmission, a shift-up point is changed in accordance with engine torque, hence the vehicle can cope with a sporty or zippy driving on a winding load or the like. That is, in the power mode 3, the high response characteristic is set with respect to the operation amount of the accelerator pedal 14 and hence, in case of a vehicle with a 3 litter engine, for example, a maximum torque is generated at a lower operation amount of the accelerator pedal 14 such that a potential of the 3 litter engine can be exercised at maximum. Here, driving force indication values (target torques) of the respective modes (normal mode 1, save mode 2, power mode 3) are, as described later, set based on 2 parameters consisting of an engine rotational speed and accelerator opening degree.

Figure 4:
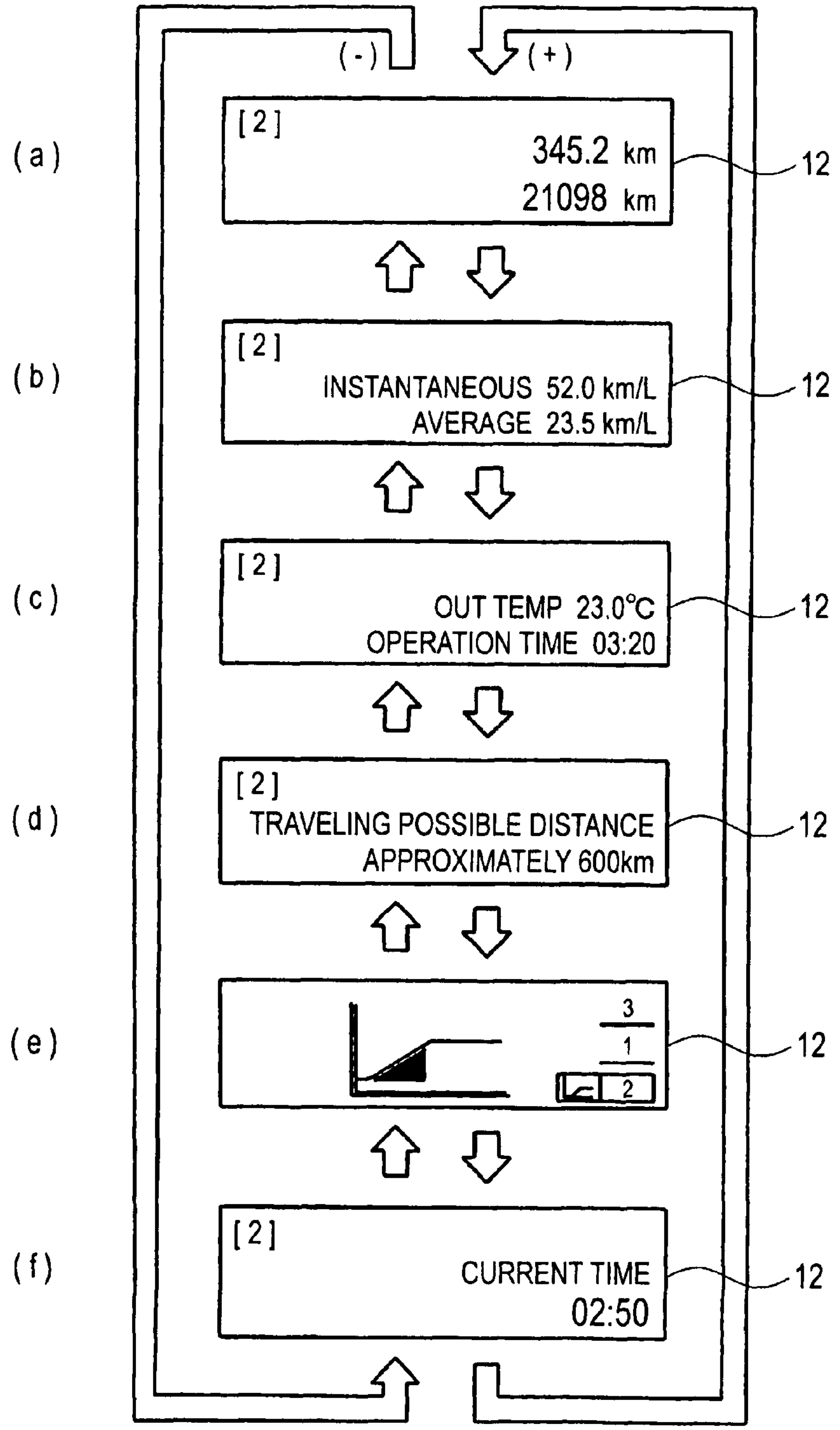
FIG. 4 is an explanatory view showing a display example of a multi-information display.

A display changeover switch 10 is manipulated to change over information displayed on a MID 12 and includes a forward feeding switch portion 10*a*, a reverse feeding switch portion 10*b*, and a reset switch portion 10*c*. FIG. 4 illustrates items for every images displayed on the MID 12 as an example. Here, the MID 12 may be a color display.

In this embodiment, 6 kinds of images (a) to (f) are set, wherein each time the forward feeding switch portion 10*a* is turned on, the images are changed over in order from (a) to (f). When the forward feeding switch portion 10*a* is turned on in a state that the image (f) is displayed, the initial image (a) is displayed. On the other hand, when the reverse feeding switch portion 10*b* is turned on, the image is changed over in the reverse direction.

The image (a) is an initial image which is displayed when the ignition switch is turned on. On the image (a), an odometer is displayed in a lower stage and a trip meter is displayed in an upper stage. Further, a current mode ("2" indicative of the save mode 2 in the drawing) is displayed at a left end of the image (a).

On the image (b), a mileage measured by the trip meter and a trip average fuel consumption [km/L] calculated based on a total fuel injection pulse width (pulse time) in the mileage are displayed in a lower stage, while a mileage during several seconds and an instantaneous fuel consumption [km/L] calculated based on the total fuel injection pulse width (pulse time) in the moment are displayed in an upper stage.

On the image (c), an operation time from a point of time that the engine is started is displayed in a lower stage and an outside temperature [° C.] is displayed in an upper stage.

On the image (d), an approximately traveling possible distance [Km] calculated based on residual fuel quantity in the inside of a fuel tank and the trip average fuel consumption is displayed.

On the image (e), an acceleration-torque line of the currently selected mode (the save mode 2 being indicated in the drawing) is displayed. In the acceleration-torque line, an output torque of the engine is taken on an axis of ordinates and the accelerator opening degree is taken on an axis of abscissas, and a power display region P is set in the inside of the displayed acceleration-torque line. In the power display region P, being interlocked with the increase or the decrease of the accelerator opening degree, the band showing the power level is linearly expanded or contracted in a transverse direction. Accordingly, by observing the displayed power level, the driver can easily grasp the current driving state.

The current time is displayed on the image (f).

Figure 5A:
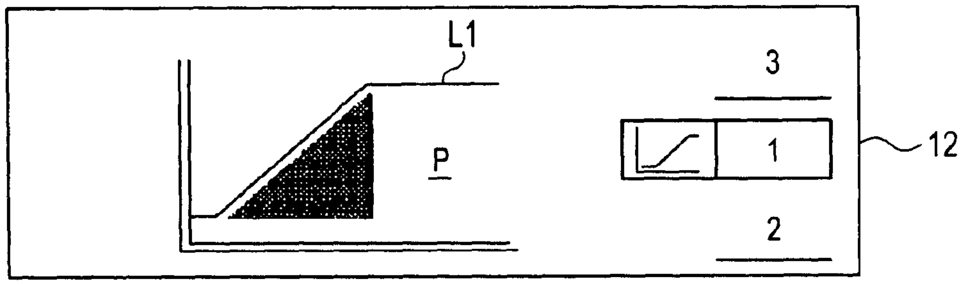
FIG. 5A to FIG. 5C are explanatory views showing a display example of the multi-information display at the time of changing over a mode.
Figure 5B:
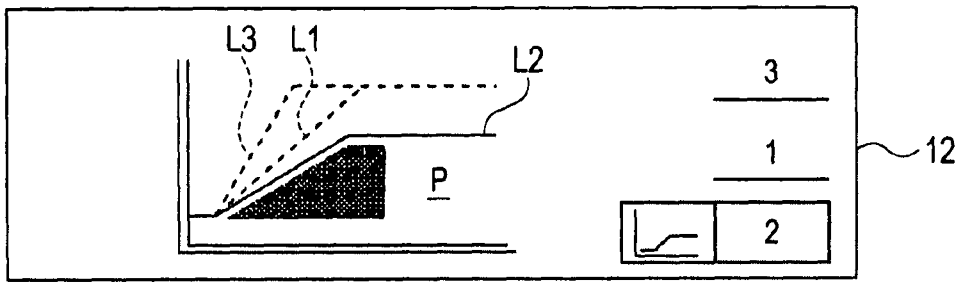
Figure 5C:
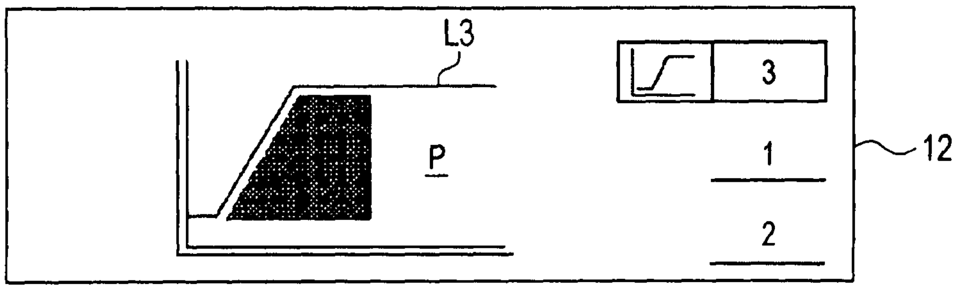

As shown in FIG. 5A to FIG. 5C, the above-mentioned acceleration-torque line displayed on the image (e) differs for every selected mode, that is, the normal mode 1, the save mode 2 or the power mode 3. FIG. 5A shows the acceleration-torque line L1 which constitutes a driving force characteristic line displayed when the normal mode 1 is selected. FIG. 5B shows the acceleration-torque line L2 which constitutes a driving force characteristic line displayed when the save mode 2 is selected. And FIG. 5C shows the acceleration-torque line L3 which constitutes a driving force characteristic line displayed when the power mode 3 is selected.

Here, the above-mentioned image (e) shown in FIG. 4 may be displayed on the MID 12 as an initial image when the ignition switch is turned on. In this case, immediately after the initial image is displayed, the respective acceleration-torque lines L1, L2, L3 are simultaneously displayed and, with a time delay, other acceleration-torque lines may be faded out while leaving only the acceleration-torque line corresponding to the currently set mode.

In FIG. 5B, to compare the driving force characteristics of the acceleration-torque lines L1, L2, L3 for respective modes, the acceleration-torque lines L1, L3 are indicated by a broken line in an overlapped manner. Here, these acceleration-torque lines L1, L3 are indicated for the conveniences sake and are not displayed in an actual operation. As shown in FIG. 5B, the power mode 3 possesses the characteristic which exhibits a larger throttle change quantity in response to a step-on operation of the accelerator pedal. Here, a larger target torque is set with respect to the accelerator opening degree. The normal mode 1 is set to possess the characteristic where the throttle opening is linearly arranged with respect to the operation amount of the accelerator pedal. Compared to the driving force characteristic of the power mode 3, the normal mode 1 possesses the characteristic which exhibits the relatively small throttle change quantity in response to the step-on operation of the accelerator pedal. That is, the normal mode 1 is set to acquire the favorable driving performance in a usual driving region where the accelerator opening degree is relatively small.

Further, the save mode 2 is set such that the driver can enjoy the acceleration work with the smooth output characteristic while ensuring a sufficient output.

Here, the content displayed in FIG. 5A to FIG. 5C (the image shown in FIG. 4(*e*)) may be always displayed on an information display which is separately provided in the inside of the tachometer 3*a*. Alternatively, only the display content shown in FIG. 5A to FIG. 5C is displayed on the MID 12 and other display contents shown in FIG. 4 may be displayed on an information display which is additionally provided.

Further, in the fuel consumption meter 13, a neutral position indicates the trip average fuel consumption [Km/L]. When the instantaneous fuel consumption [Km/L] is higher than the trip average fuel consumption [Km/L], a pointer 13*a* is swung in the plus (+) direction in response to the deviation, while when the instantaneous fuel consumption [Km/L] is lower than the trip average fuel consumption [Km/L], the pointer 13*a* is swung in the minus (−) direction in response to the deviation.

Figure 6:
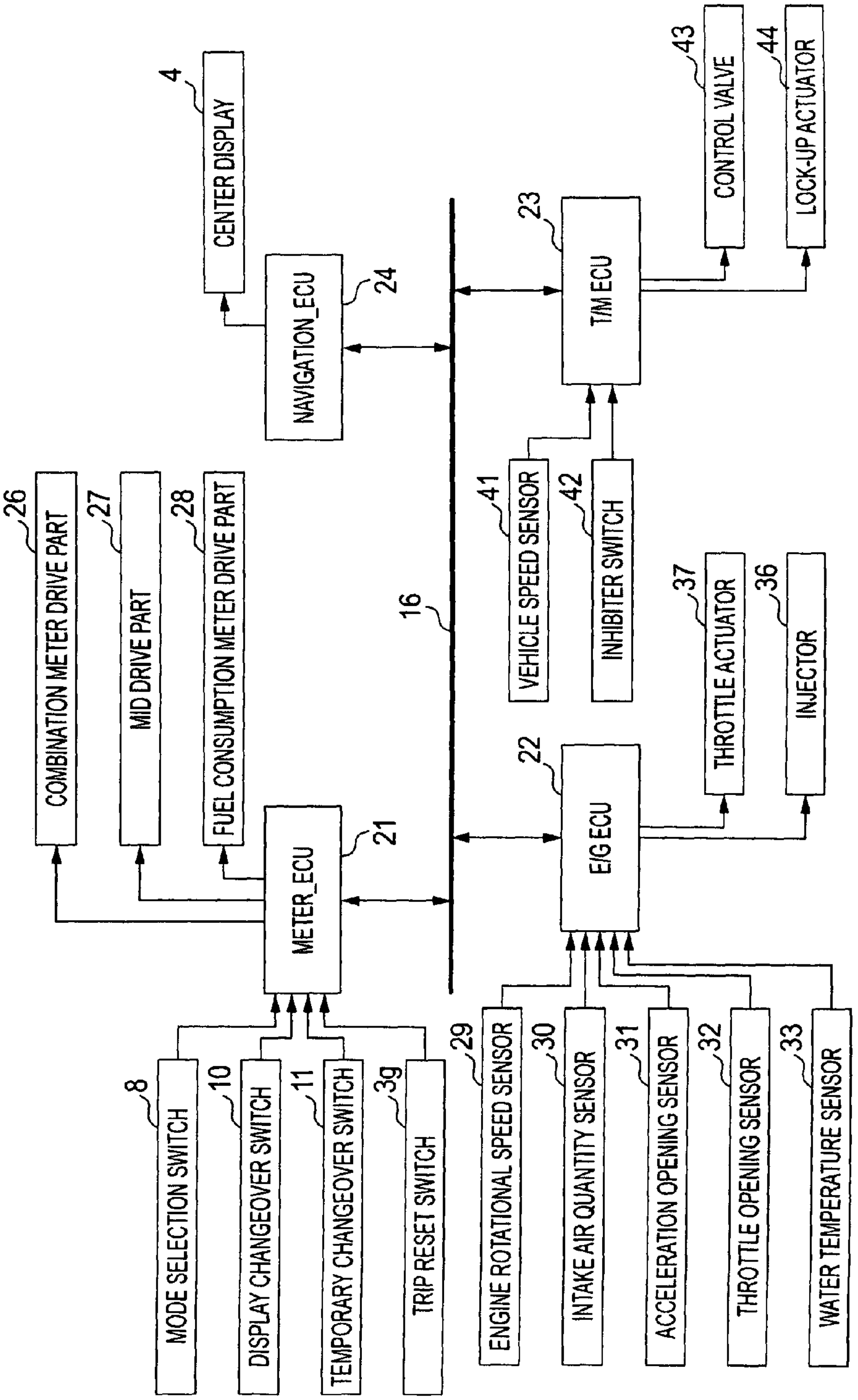
FIG. 6 is a constitutional view of a driving force control unit.

Here, as shown in FIG. 6, to the vehicle, through an interior communication circuit 16 such as a CAN (Controller Area Network) communication, control devices which constitutes arithmetic operation means for controlling the vehicle such as a meter control device (meter_ECU) 21, an engine control device (E/G_ECU) 22, a transmission control device (T/M_ECU) 23, a navigation control device (navigation_ECU) 24 are connected in an intercommunicable manner. Each one of the ECU 21 to 24 is mainly constituted of a computer such as a microcomputer and includes well-known CPU, ROM, RAM and a non-volatile memory means such as EEPROM.

The meter_ECU 21 is provided for controlling the whole display of the combination meter 3. Here, the mode selection switch 8, the display changeover switch 10, a temporary changeover switch 11 and the trip reset switch 3*g* are connected to an input side of the meter_ECU 21, while instruments such as the tachometer 3*a*, the speed meter 3*b*, the water temperature meter 3*c*, the fuel meter 3*d*, a combination meter drive part 26 which drives the warning lamp 3*f*, an MID drive part 27, and a fuel meter drive part 28 are connected to an output side of the meter_ECU 21.

The E/G_ECU 22 is provided for controlling an operation state of the engine. To an input side of the E/G_ECU 22, a group of sensors which detect the vehicle and engine operation states such as an engine rotational speed sensor 29 which constitutes an operation state detection means for detecting an engine rotational speed which is a typical example of parameters indicating the engine operation state based on a rotation of a crankshaft or the like, an intake air quantity sensor 30 which is arranged immediately downstream of an air cleaner or the like and detects the intake air quantity, an accelerator opening sensor 31 which constitutes an accelerator opening detection means for detecting accelerator opening degree of the accelerator pedal 14, a throttle opening sensor 32 which is interposed in an intake passage and detects opening of a throttle valve (not shown in the drawing) for adjusting an intake air quantity supplied to respective cylinders of the engine, a water temperature sensor 33 which constitutes an engine temperature detection means for detecting cooling water temperature indicative of an engine temperature are connected. Further, to an output side of the E/G_ECU 22, a group of actuators which controls the driving of the engine such as an injector 36 which injects a predetermined measured fuel to a combustion chamber, a throttle actuator 37 which is mounted in an electronic throttle control device (not shown in the drawing) are connected.

The E/G_ECU 22 sets fuel injection timing and a fuel injection pulse width (pulse time) with respect to the injector 36 based on inputted detection signals from the respective sensors. Further, E/G_ECU 22 outputs the throttle driving signal to the throttle actuator 37 which drives the throttle valve thus controlling the opening of the throttle valve.

Figure 11A:
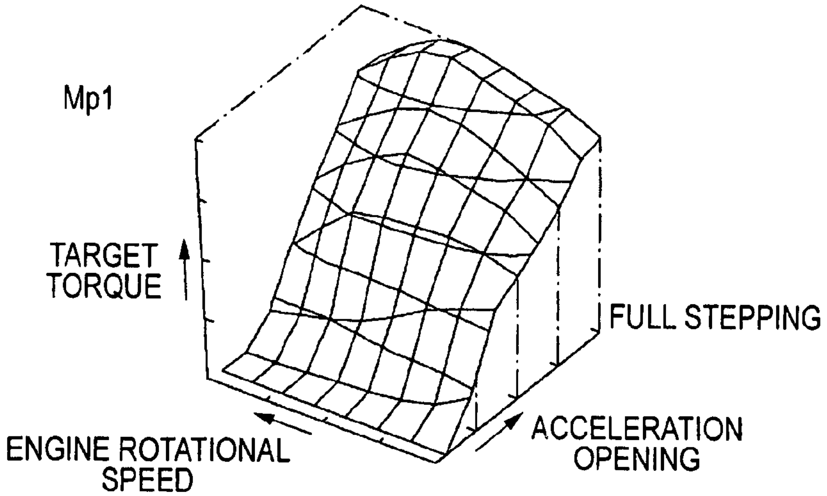
FIG. 11A is a conceptual view of a normal mode map.
Figure 11B:
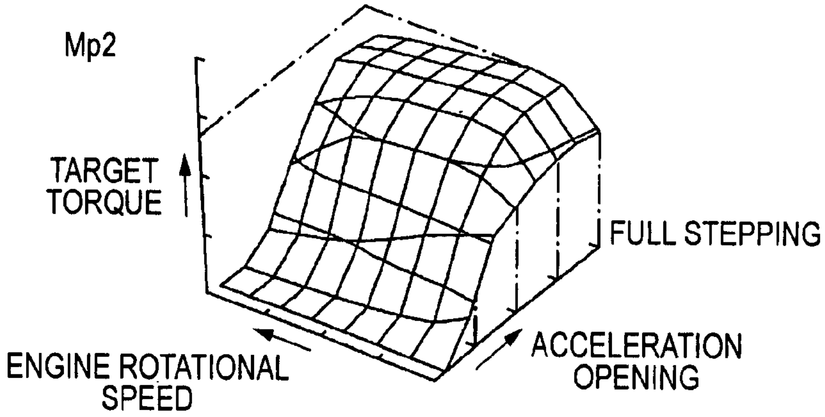
FIG. 11B is a conceptual view of a save mode map.
Figure 11C:
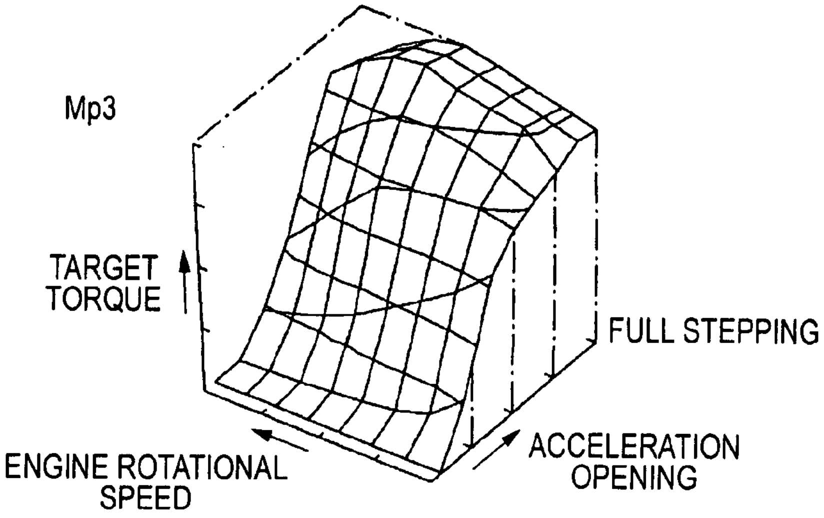
FIG. 11C is a conceptual view of a power mode map.

Here, in the volatile memory means which is provided to the E/G_ECU 22 and constitutes a portion of the driving force setting means, a plurality of different driving force characteristics is stored in a map form. As the respective driving force characteristics, in this embodiment, three kinds of mode maps Mp1, Mp2, Mp3 are provided. As shown in FIG. 11A to FIG. 11C, the respective mode maps Mp1, Mp2, Mp3 are configured as a three-dimensional map in which the accelerator opening degree and the engine rotational speed are taken on matrix axes, and driving force indication values (target torques) are stored in respective matrix points.

The respective mode maps Mp1, Mp2, Mp3 are basically selected by the manipulation of the mode selection switch 8. That is, when the normal mode 1 is selected by the mode selection switch 8, the normal mode map Mp1 which constitutes the first mode map is selected. When the save mode 2 is selected by the mode selection switch 8, the save mode map Mp2 which constitutes the second mode map is selected. Further, when the power mode 3 is selected by the mode selection switch 8, the power mode map Mp3 which constitutes the third mode map is selected.

Hereinafter, the driving force characteristics of the respective mode maps Mp1, Mp2, Mp3 are explained. The normal mode map Mp1 shown in FIG. 11A is set to exhibit the characteristic in which the target torque is linearly changed in a region where the accelerator opening degree is relatively small, and the maximum target torque is obtained when the opening of the throttle valve is close to a wide-open throttle.

Further, in the save mode map Mp2 shown in FIG. 11B, compared to the above-mentioned normal mode map Mp1, the elevation of the target torque is suppressed and hence, the driver can enjoy the acceleration work by widely using the stroke of the accelerator pedal 14. Further, since the elevation of the target torque is suppressed, it is possible to achieve both of the easy drive ability and the low fuel consumption in a well balanced manner. For example, in case of a vehicle with a 3 litter engine, the smooth output characteristic is obtained while ensuring a sufficient output corresponding to the 2 litter engine. Particularly, the target torque is set to achieve easy-to-drive performance in a practical-use region such as traveling in towns.

Further, in the power mode map Mp3 shown in FIG. 11C, a change rate of the target torque in response to the change of the accelerator opening degree is largely set in the substantially all driving region. Accordingly, for example, in case of a vehicle with a 3 litter engine, the target torque is arranged to maximize potential of the 3 litter engine. Here, the substantially same driving force characteristic is set in a low speed region including an idling rotational speed in the respective mode maps Mp1, Mp2, Mp3.

In this manner, according to this embodiment, when any one of the modes 1, 2, 3 is selected in response to the manipulation of the mode selection switch 8 by the driver, the corresponding mode map Mp1, Mp2 or Mp3 is selected, and the target torque is set based on the mode map Mp1, Mp2 or Mp3 and hence, the driver can enjoy three kinds of acceleration responses which differ completely from each other using one vehicle.

Here, an open/close speed of the throttle valve is also set such that the throttle valve is operated gently in the mode map Mp2 and is rapidly operated in the mode map Mp3.

Further, the T/M_ECU 23 is provided for performing the gear change control of the automatic transmission. To an input side of the T/M_ECU 23, a vehicle speed sensor 41 which detects a vehicle speed based on a rotational speed of a transmission output shaft or the like, an inhibiter switch 42 which detects a range in which the selection lever 7 is positioned are connected, while to an output side of the T/M_ECU 23, a control valve 43 which performs the gear change control of the automatic transmission and a lock-up actuator 44 which performs a lock-up operation of a lock-up clutch are connected. The T/M_ECU 23 determines the range of the selection lever 7 in response to a signal from the inhibitor switch 42. When the selection lever 7 is positioned in a D range, the T/M_ECU 23 performs the change gear control by outputting a change gear signal to the control valve 43 in accordance with a predetermined transmission pattern. Here, the transmission pattern is variably set corresponding to the modes 1, 2, 3 set in the E/G_ECU 22.

Further, when the lock-up condition is satisfied, a slip lock-up signal or a lock-up signal is outputted to the lock-up actuator 44 so as to changeover the relationship between input/output elements of a torque converter into a slip lock-up state or a lock-up state from a converter state. Here, the E/G_ECU 22 corrects the target torque $\tau e$ when the state of the torque converter is changed to a slip lock-up state or a lock-up state. As a result, for example, when the mode M is set to the save mode 2, the target torque τe is corrected to the one which allows more economical traveling.

The navigation_ECU 24 is mounted in a well-known car navigation system, and detects a position of the vehicle based on positional data obtained from a GPS satellite or the like and, at the same time, calculates a guide route to the destination. Further, the navigation_ECU 24 displays the present position and the guide route of the own car as the map data on the center display 4. In this embodiment, the navigation_ECU 24 can display various information to be displayed on the MID 12 on the center display 4.

Next, steps for controlling the operation state of the engine executed by the above-mentioned E/G_ECU 22 is explained in accordance with flowcharts shown in FIG. 7 to FIG. 10.

Figure 7:
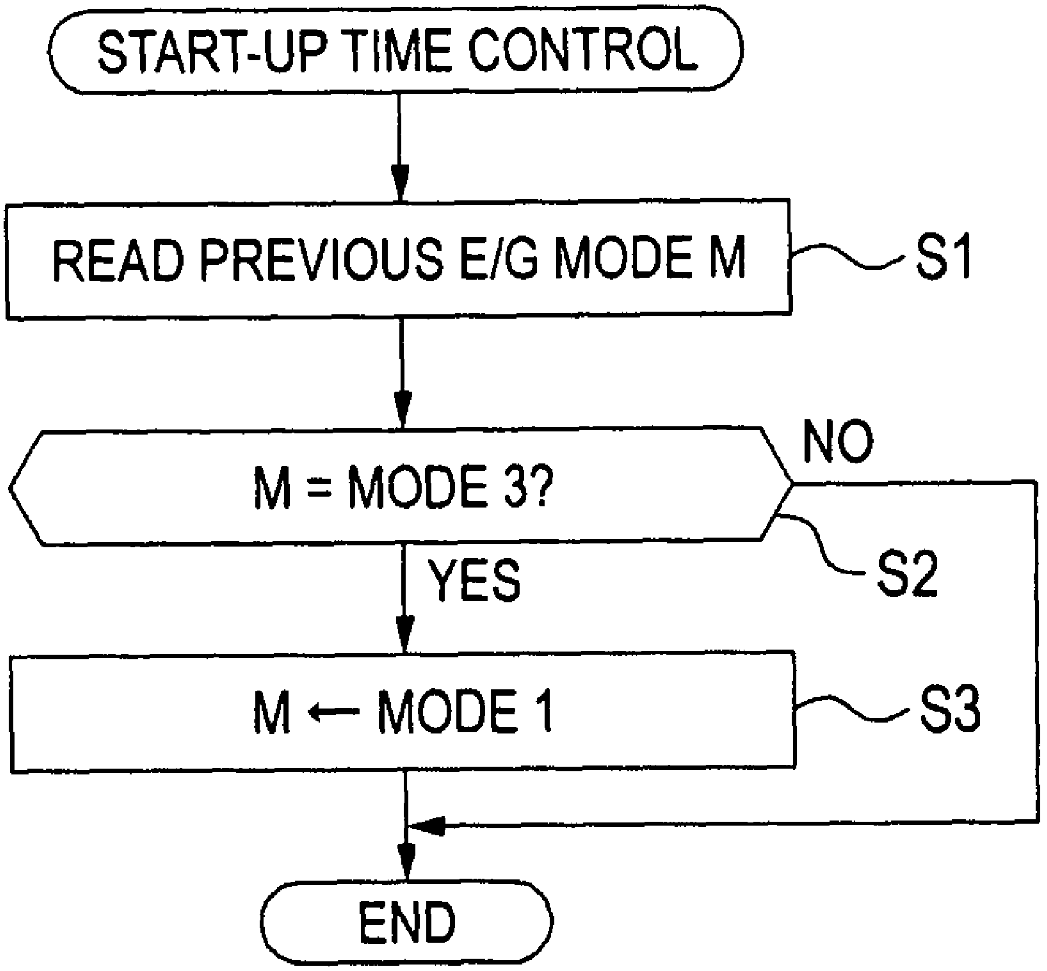
FIG. 7 is a flowchart showing a starting time control routine.

When the ignition switch is turned on, first of all, the start-up time control routine shown in FIG. 7 is initiated only one time. In this routine, first of all, in step S1, the mode M (M: normal mode 1, save mode 2, power mode 3) stored the last time the ignition switch was turned off is read.

Then, the processing advances to step S2, and it is determined whether the mode M is the power mode 3 or not. When the mode M is the power mode 3, the mode M is forcibly set to the normal mode 1 (M←mode 1) and the routine is finished.

Further, when the mode M is the mode other than the power mode 3, that is, the normal model or the save mode 2, the routine is finished as it is.

In this manner, when the mode M stored the last time the ignition switch was turned off is the power mode 3, the mode M at the time of turning on the ignition switch is forcibly changed to the normal mode 1 (M←mode 1), hence there is no possibility that the vehicle starts rapidly and, thus, the vehicle can obtain the favorable start performance even when the accelerator pedal 14 is slightly depressed.

Figure 8:
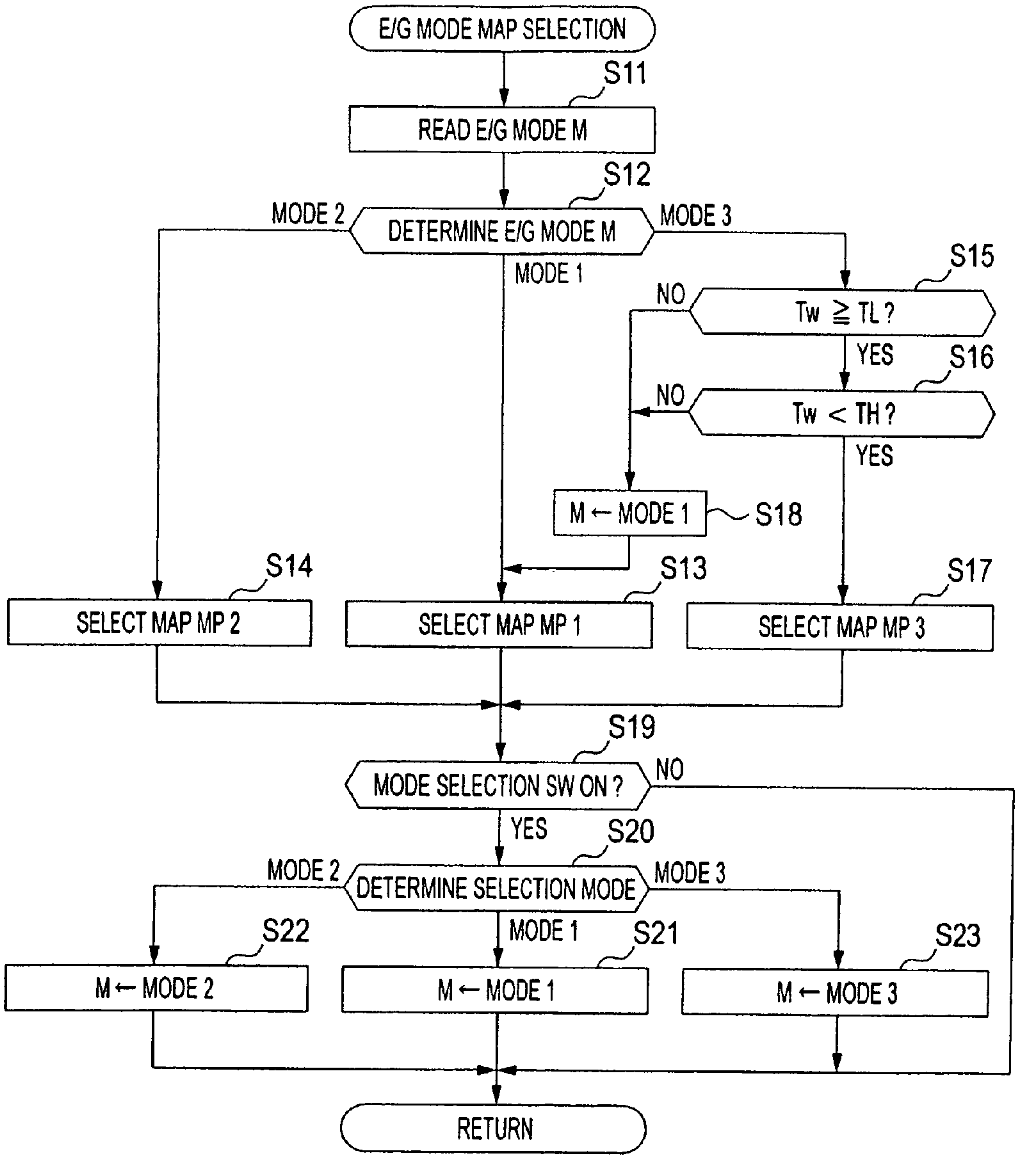
FIG. 8 is a flowchart showing a mode map selection routine.
Figure 9:
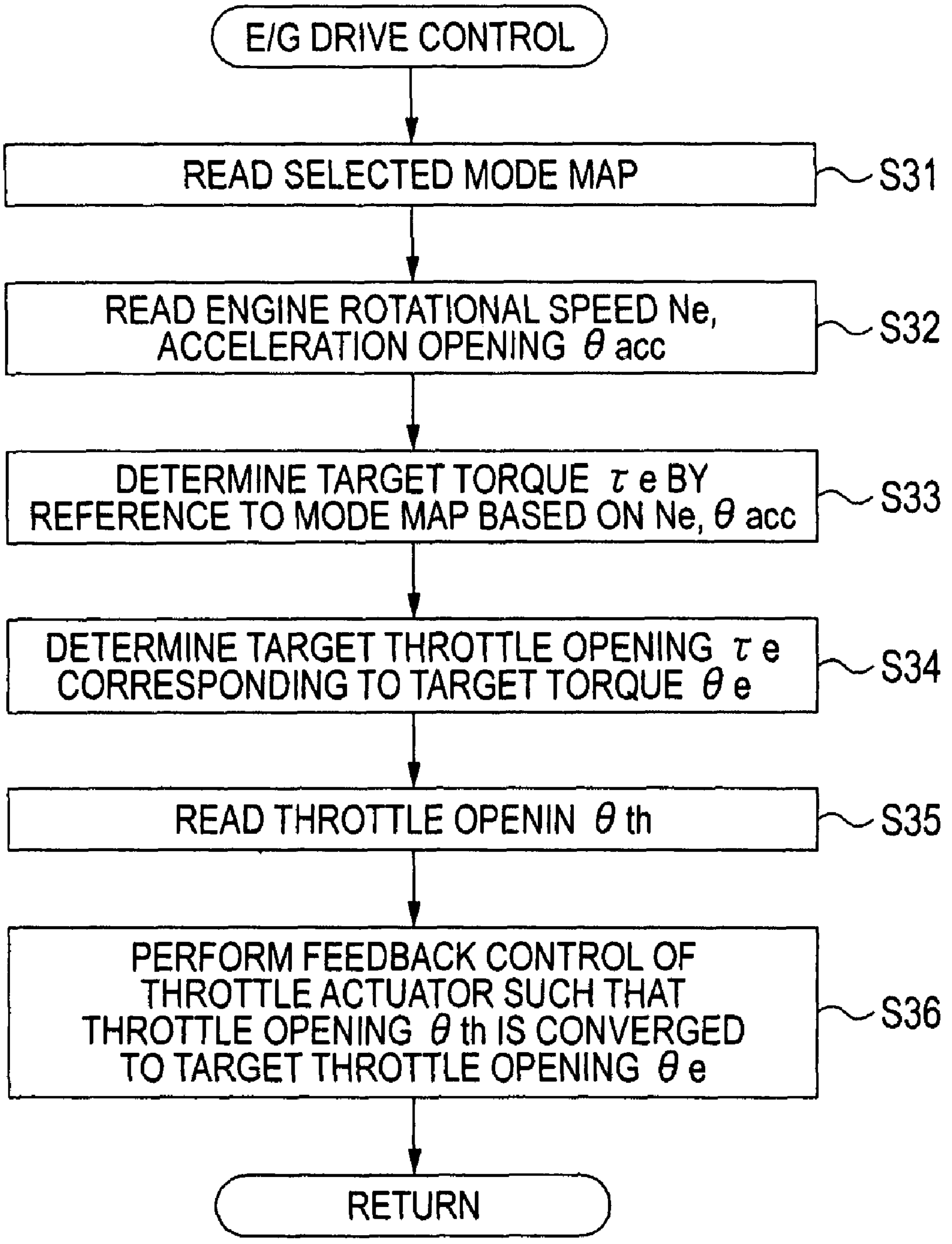
FIG. 9 is a flowchart showing an engine control routine.
Figure 10:
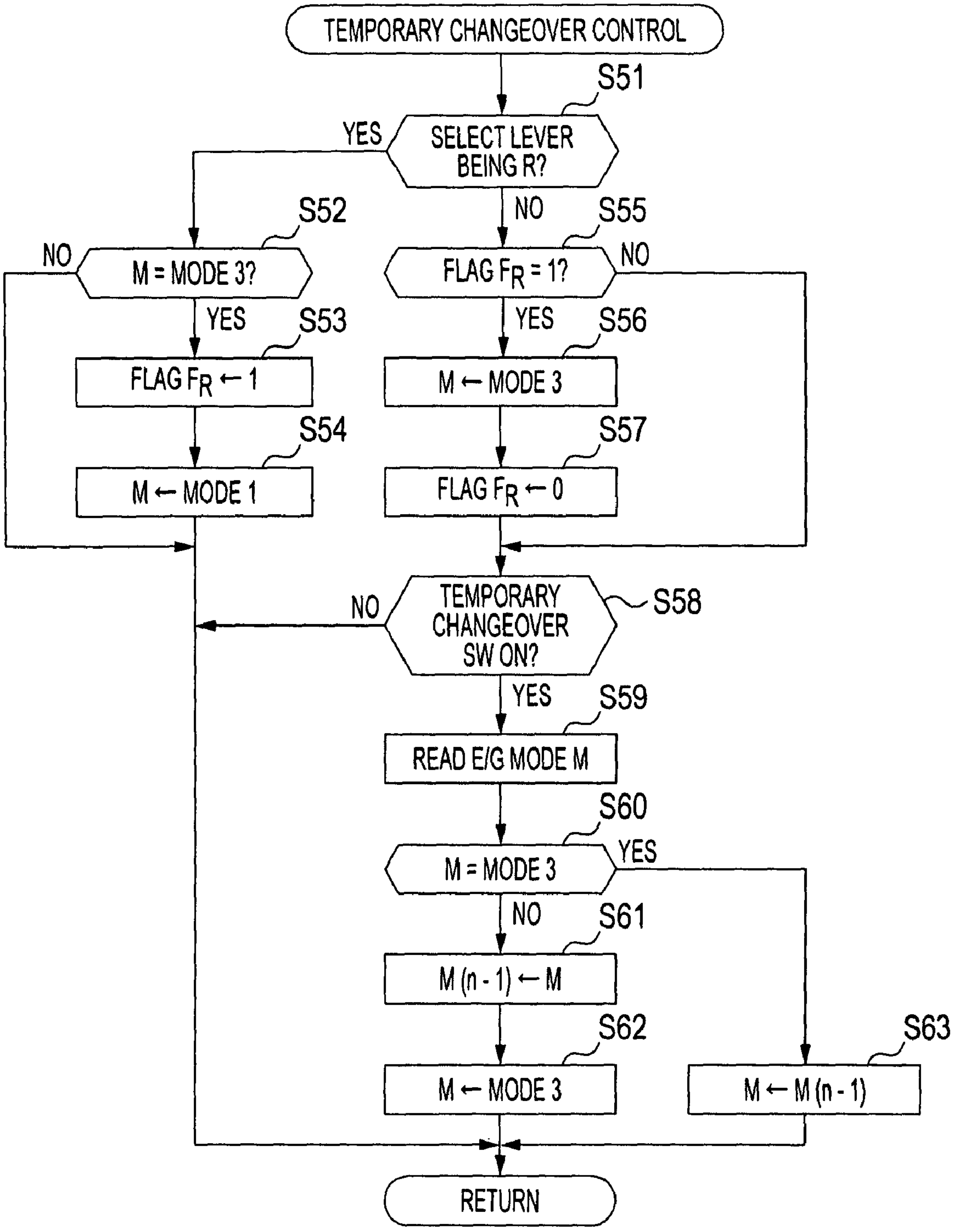
FIG. 10 is a flowchart showing a temporary changeover control routine.

Then, when this start-up time control routine is finished, the routines shown in FIG. 8 to FIG. 10 are executed for every predetermined calculation cycle. First of all, the mode map selection routine shown in FIG. 8 is explained.

In this routine, first of all, the currently set mode M is read in step S11, and it is determined which mode (normal mode 1, save mode 2 or power mode 3) is set by reference to the number of the mode M in step S12. Then, when set is the normal mode 1, the processing advances to step S13. When set is the save mode 2, the processing is branched to step S14. Further, when set is the power mode 3, the processing is branched to step S15. Here, at the time of executing the first routine after the ignition switch is turned on, the mode M is either one of the normal mode 1 or the save mode 2 and hence, the processing is not branched in step S15. However, when the driver rotates the manipulation knob 8*a* of the mode selection switch 8 in the right direction after the ignition switch is turned on to select the power S# mode, the mode M is set to the power mode 3 in step S23 described later and hence, the processing is branched to step S15 from step S12 at the time of executing succeeding routine.

Then, when it is determined that the mode M is set to the normal mode 1 and the processing advances to step S13, the normal mode map Mp1 stored in the non-volatile memory means of the E/G_ECU 22 is set as the mode map of this time and the processing advances to step S19. Further, when it is determined that the mode M is set to the save mode 2 and the processing advances to step S14, the save mode map Mp2 is set as the mode map of this time and the processing advances to step S19.

On the other hand, when it is determined that the mode M is set to the power mode 3 and the processing is branched to step S15, in steps S15 and S16, a cooling water temperature Tw detected by the water temperature sensor 33 as the engine temperature is compared with a predetermined lower temperature as a warm-up determination temperature TL and a predetermined upper temperature as an over heat determination temperature TH. Then, when it is determined that the cooling water temperature Tw is equal to or above the warm-up determination temperature TL (Tw≧TL) in step S15 and when it is determined that the cooling water temperature Tw is below the over heat determination temperature TH (Tw<TH) in step S16, the processing advances to step S17.

On the other hand, when it is determined that the cooling water temperature Tw is below the warm-up determination temperature TL (Tw<TH) in step S15 or when it is determined that the cooling water temperature Tw is equal to or above the over heat determination temperature TH (Tw>TH) in step S16, the processing is branched to step S18 and the mode M is set to normal mode 1 (M←mode 1) and the processing returns to step S13.

In this manner, according to this embodiment, even when the driver manipulates the mode selection switch 8 to select the power mode 3 after the ignition switch is turned on, the mode M is forcibly made to return to the normal mode 1 in the event that the cooling water temperature Tw is equal to or below the warm-up determination temperature TL or equal to or above the over heat determination temperature TH. Accordingly, a discharge quantity of exhaust emission can be suppressed at the time of engine warm-up, and the engine and its peripheral equipment can be protected from a heat defect by suppressing the output at the time of over heat. Here, when the mode M is forcibly made to return to the normal mode 1, the warning lamp 3*f* is turned on or blinked to inform the driver that the mode M is forcibly made to return to the normal mode 1. In this case, the return of the mode M to the normal mode 1 may be notified by a buzzer or sounds.

Next, when the processing advances to step S19 from any one of steps S13, S14 and S17, it is determined whether the mode selection switch 8 is manipulated or not. When it is determined that the manipulation of the mode selection switch 8 is not performed, the routine is finished. Further, when it is determined that the manipulation of the mode selection switch 8 is performed, the processing advances to step S20 and it is determined which mode is selected by the driver.

Then, when it is determined that the driver selects the normal mode (the knob 8*a* being rotated in the left direction), the processing advances to step S21 to set the mode M to the normal mode 1 (M←mode 1), and the routine is finished. Further, when it is determined that the driver selects the save mode 2 (the knob 8*a* being pushed) (M←mode 2), the processing advances to step S22 to set the mode M to the save mode 2 (M←mode 2), and the routine is finished. Further, when it is determined that the driver selects the power mode 3 (the knob 8*a* being rotated in the right direction), the processing advances to step S23 to set mode M to the power mode 3 (M←mode 3), and the routine is finished.

In this manner, in this embodiment, the E/G_ECU 22 functions as the mode selection control means.

In this embodiment, the mode M can be set to the power mode 3 by manipulating the knob 8*a* of the mode selection switch 8 after turning on the ignition switch and hence, it is also possible to start the vehicle with the power mode 3. In this case, the driver consciously selects the power mode and hence, the driver would not be frightened at the large driving force generated at the start.

Next, an engine control routine shown in FIG. 9 is explained.

In this routine, first of all, in step S31, the currently selected mode map (Mp1, Mp2 or Mp3: see FIG. 11) is read and, subsequently, in step S32, an engine rotational speed Ne detected by the engine rotational sensor 29 and accelerator opening degree θacc detected by the accelerator opening sensor 31 are read.

Then, the processing advances to step S33 in which a target torque τe which constitutes a driving force indication value is determined based on both parameters Ne and θacc by reference to the mode map read in step S31 with the interpolation calculation.

Next, the processing advances to step S34 in which a target throttle opening θe corresponding to the target torque τe is determined as a final driving force indication value.

Then, the processing advances to step S35 in which a throttle opening θth detected by the throttle opening sensor 32 is read. In step S36, a feedback control is applied to the throttle actuator 37 which performs an open/close operation of the throttle valve mounted in the electronic throttle control device such that the throttle opening θth is converged to the target throttle opening θe. Then, the routine is finished.

As a result, when the driver manipulates the accelerator pedal 14, the throttle valve is opened or closed in accordance with the mode maps Mp1, Mp2 and Mp3 corresponding to the mode M (M: normal mode 1, save mode 2, power mode 3) selected by the driver, using the accelerator opening degree θacc and the engine rotational speed Ne as parameters. When the mode M is set to the normal mode 1, an output torque is preset approximately linearly with respect to an operation amount of the accelerator pedal (accelerator opening degree θacc) and hence, the normal driving can be performed.

Further, when the mode M is set to the save mode 2, the elevation of the target torque is suppressed and hence, the driver can enjoy the acceleration work by widely using the stroke of the accelerator pedal 14 and, at the same time, it is possible to acquire both of easy drive ability and low fuel consumption in a well-balanced manner. Accordingly, even in case of a vehicle with a 3 litter engine, the smooth driving can be performed while ensuring a sufficient output corresponding to the 2 litter engine and hence, the vehicle can obtain the favorable driving performance in a practical-use region such as towns and the cities.

Further, when the mode M is set to the power mode 3, a high acceleration response is obtained and hence, the vehicle can perform more sporty traveling.

As a result, the driver can enjoy three kinds of acceleration responses which completely differ from each other with one vehicle. Accordingly, the driver can arbitrarily select the preferred driving force characteristic even after purchasing the vehicle and can drive the vehicles corresponding to three vehicles having different characteristics with one vehicle.

Further, in this embodiment, when the temporary changeover switch 11 which is mounted on the steering wheel 9 is manipulated or the selection lever 7 is positioned to the R range, the mode M is temporarily changed over. This temporarily changeover control is executed in accordance with a temporarily changeover control routine shown in FIG. 10.

In this routine, first of all, it is determined whether the selection lever 7 is positioned to the R range or not based on a signal from the inhibitor switch 42 in step S51. When it is determined that the selection lever 7 is positioned to the R range, the processing advances to step S52, while when the selection lever 7 is positioned to a range other than the R range, the processing advances to step S55.

When the processing advances to step S52, the current mode M is referred and the routine is finished except for a state in which the mode M is set to the power mode 3. Further, when the mode M is set to the power mode 3, the processing advances to step S53 to set a reverse flag FR (FR←1) and the processing advances to step S54 to set the mode M to the normal mode 1 (M←mode 1) and the routine is finished.

In this manner, according to this embodiment, when the selection lever 7 is moved to the R range in a state that the mode M is set to the power mode 3, the mode M is forcibly changed over to the normal mode 1 and hence, even when the accelerator pedal 14 is depressed slightly at driving the vehicle backward, there is no possibility that the vehicle suddenly travels backward thus acquiring the favorable backward travel performance.

On the other hand, when it is determined that the selection lever 7 is positioned to the range other than the R range in step S51 and the processing advances to step S55, the reverse flag FR is referred. When the reverse flag FR is 1 (FR=1), that is, in the first routine after the selection lever 7 is changed over to another range from the R range, the processing advances to step S56 in which the mode M is made to return to the power mode 3 (M←mode 3). Then the processing advances to step S57 in which the reverse flag FR is cleared (FR←0) and the processing advances to step S58.

As a result, in a state that after the mode M is forcibly changed over to the normal mode 1 from the power mode 3 because of the manipulation of the selection lever 7 to the R range, the selection lever 7 is moved to the D range, for example, the mode M is made to automatically return to the initial power mode 3 and hence, the driver can start the vehicle without feeling a discomfort.

Further, when it is determined that the reverse flag FR is 0 (FR=0) in step S55, the processing jumps to step S58.

Then, when the processing advances to step S58 from step S55 or step S57, it is determined whether the temporary changeover switch 11 is turned on or not. Then, when it is determined that the temporary changeover switch 11 is not turned on, the routine is finished as it is.

On the other hand, when it is determined that the temporary changeover switch 11 is turned on, the processing advances to step S59 to read the current mode M, and in step S60, it is determined whether the mode M is set to the power mode 3 or not.

Then, when it is determined that the mode M is set to a mode (normal mode 1 or save mode 2) other than the power mode 3, the processing advances to step S61 in which the mode M at the time the temporary changeover switch 11 is turned on is stored as a previous mode M(n−1) (M(n−1)←M) and the processing advances to step S62. In step S62, the current mode M is set to the power mode 3 (M←mode 3) and the routine is finished.

In this manner, according to this embodiment, even when the mode M is set to the normal mode 1 or the save mode 2 using the mode selection switch 8, the mode M can be changed over to the power mode 3 by turning on the driver's-side temporary changeover switch 11. As a result, in traveling an ascending slope which requires power, the mode M can be easily changed over to the power mode 3 from the normal mode 1 or the save mode 2 temporarily and hence, the vehicle can acquire the favorable traveling performance. Further, the temporary changeover switch 11 is mounted on the steering wheel 9 and hence, the driver can easily change over the mode M without leaving his/her hand from the steering wheel 9 thus improving the manipulability.

Further, when it is determined that the current mode M is set to the power mode 3 in step S60, the processing is branched to the step S63 in which the previous mode M(n−1) is read to be the current mode M (M←M (n−1)) and the routine is finished.

As a result, by manipulating the temporary changeover switch 11 again after the mode M is temporarily changed over to the power mode 3, the mode M is made to return to the initial mode M (normal mode 1 or save mode 2).

The invention is not limited to the above-mentioned embodiment. For example, two kinds or four kinds or more of mode maps which differ in driving force characteristics from each other may be set. By setting the mode maps in this manner, the driver can drive the vehicle corresponding to two or four or more vehicles having different driving force characteristics with one vehicle. Further, the driving force characteristic of the mode map may be changed corresponding to liking of the driver.

Further, in this embodiment, the case in which the target torque is set using the plurality of mode maps having the plurality of different driving force characteristics based on the accelerator opening degree and the engine rotational speed is exemplified. However, the invention is not limited to such a case and the target torques of the respective driving force characteristics may be obtained by calculation based on the accelerator opening degree and the engine rotational speed.

Further, in this embodiment, the explanation is made using the throttle actuator 37 which drives the throttle valve mounted on the electron control throttle device as a controlling object. However, the controlling object is not limited to the throttle actuator 37. For example, in the diesel engine, an injector drive device may be set as the controlling object and an injection quantity of fuel injected from the injector drive device may be set based on a target torque $\tau e$. Further, in an engine which performs an open/close operation of an intake valve using a solenoid valve mechanism, the solenoid valve mechanism may be set as the controlling object and the valve opening of the intake valve which is driven by the solenoid valve mechanism may be set based on the target torque $\tau e$.

What is claimed is:

1. A driving force control unit for a vehicle, comprising:
a display provided with an instrument panel;
an accelerator opening degree detecting unit which detects an accelerator opening degree;
a driving condition detecting unit which detects an engine driving condition;
a driving force setting unit which sets a driving force indication value according to a plurality of different driving force characteristics based on said accelerator opening degree and said engine driving condition; and
a selector which, based upon a manipulation of the selector, selects a driving force characteristic from said plurality of different driving force characteristics,
wherein said driving force setting unit sets said driving force indication value according to said selected driving force characteristic,
wherein said driving force setting unit memorizes a plurality of mode maps, said plurality of mode maps basing a driving force indication value on said accelerator pedal opening degree and said engine driving condition,
wherein said driving force setting unit controls said display so as to display a characteristic line for a driving force, representing an acceleration-torque,
wherein said driving force setting unit controls said display so as to display a power band based on the accelerator opening degree, and
wherein, if a temperature of a cooling water of the vehicle is outside of a predetermined temperature range for the selected driving force characteristic, the driving force setting unit selects a predetermined driving force characteristic.

2. The driving force control unit according to claim 1,
wherein said selector selects one mode map from said plurality of mode maps by manipulation, and
wherein said driving force setting unit sets said driving force according to said selected mode map.

3. The driving force control unit according to claim 1, wherein said engine driving condition includes an engine rotational speed.

4. The driving force control unit according to claim 2, wherein said driving force setting unit includes a first mode map and a second mode map,
wherein said first mode map comprises a normal driving characteristic suitable for normal driving, and
wherein said second mode map comprises a suppressed driving force characteristic.

5. The driving force control unit according to claim 2, wherein said driving force setting unit includes a first mode map, a second mode map and a third mode map,
wherein said first mode map comprises a normal driving characteristic suitable for normal driving,
wherein said second mode map comprises a suppressed driving force characteristic, and
wherein said third mode map comprises an emphasizing driving force characteristic.

6. The driving force control unit according to claim 2, further comprising:
a temporary change over switch which changes the selected mode map to another mode map temporarily.

7. The driving force control unit according to claim 1, wherein the selector is controlled independently from a transmission ratio selection of the vehicle.

8. The driving force control unit according to claim 1, wherein, if the vehicle is switched to a reverse gear, then the driving force characteristic is set to a default driving force characteristic of said plurality of different driving force characteristics.

9. The driving force control unit according to claim 1, wherein each of said plurality of mode maps comprises three axes which represent the driving force indication value, the accelerator pedal opening degree and the engine driving condition.

10. The driving force control unit according to claim 1, wherein each of said plurality of mode maps relates the driving force indication value based on a continuous relationship between said accelerator pedal opening degree and said engine driving condition.

11. The driving force control unit according to claim 1, wherein the driving force indication value comprises a target torque.

12. The driving force control unit according to claim 1, wherein said driving force setting unit memorizes the plurality of mode maps, each of said plurality of mode maps basing the driving force indication value on both said accelerator pedal opening degree and said engine driving condition.

13. The driving force control unit according to claim 1, wherein said power band includes a filled in section under the characteristic line so as to have a side of the filled in section follow a contour of the characteristic line.

14. The driving force control unit according to claim 1, wherein, if a predetermined condition occurs, the driving force characteristic is set to a driving force characteristic different from a driving force characteristic selected by an operator of the vehicle.

15. A driving force control unit for a vehicle, comprising:
an accelerator opening degree detecting unit which detects an accelerator opening degree;

a driving condition detecting unit which detects an engine driving condition;

a driving force setting unit which sets a driving force indication value according to a plurality of different driving force characteristics based on said accelerator opening degree and said engine driving condition; and a selector which, based upon a manipulation of the selector, selects a driving force characteristic from said plurality of different driving force characteristics, wherein said driving force setting unit sets said driving force indication value according to said selected driving force characteristic, and wherein upon startup of the vehicle, if the selected driving force characteristic is a power emphasizing driving force characteristic of said plurality of different driving force characteristics, then the driving force characteristic is set to a default driving force characteristic of said plurality of different driving force characteristics.

16. A driving force control unit for a vehicle, comprising:

an accelerator opening degree detecting unit which detects an accelerator opening degree;

a driving condition detecting unit which detects an engine driving condition;

a driving force setting unit which sets a driving force indication value according to a plurality of different driving force characteristics based on said accelerator opening degree and said engine driving condition; and a selector which, based upon a manipulation of the selector, selects a driving force characteristic from said plurality of different driving force characteristics, wherein said driving force setting unit sets said driving force indication value according to said selected driving force characteristic, wherein said driving force setting unit memorizes a plurality of mode maps, said plurality of mode maps basing a driving force indication value on said accelerator pedal opening degree and said engine driving condition, wherein said selector selects one mode map from said plurality of mode maps by manipulation, wherein said driving force setting unit sets said driving force according to said selected mode map, wherein said driving force setting unit includes a first mode map, a second mode map and a third mode map, wherein said first mode map comprises a normal driving characteristic suitable for normal driving, wherein said second mode map comprises a suppressed driving force characteristic, wherein said third mode map comprises an emphasizing driving force characteristic, and wherein, if the third mode map is selected and a temperature of a cooling water of the vehicle is less than a predetermined warm-up temperature, then the driving force setting unit selects the first mode map.

17. A driving force control unit for a vehicle, comprising:

an accelerator opening degree detecting unit which detects an accelerator opening degree;

a driving condition detecting unit which detects an engine driving condition;

a driving force setting unit which sets a driving force indication value according to a plurality of different driving force characteristics based on said accelerator opening degree and said engine driving condition; and a selector which, based upon a manipulation of the selector, selects a driving force characteristic from said plurality of different driving force characteristics, wherein said driving force setting unit sets said driving force indication value according to said selected driving force characteristic, wherein said driving force setting unit memorizes a plurality of mode maps, said plurality of mode maps basing a driving force indication value, on said accelerator pedal opening degree and said engine driving condition, wherein said selector selects one mode map from said plurality of mode maps by manipulation, wherein said driving force setting unit sets said driving force according to said selected mode map, wherein said driving force setting unit includes a first mode map, a second mode map and a third mode map, wherein said first mode map comprises a normal driving characteristic suitable for normal driving, wherein said second mode map comprises a suppressed driving force characteristic, wherein said third mode map comprises an emphasizing driving force characteristic, and wherein, if the third mode map is selected and a temperature of a cooling water of the vehicle is greater than a predetermined over heat temperature, then the driving force setting unit selects the first mode map.

18. A method for controlling a drive force of a vehicle comprising:

detecting an accelerator opening degree;

detecting an engine driving condition;

selecting a driving force characteristic from a plurality of different driving force characteristics by manipulating a selector;

comparing the selected driving force characteristic with a temperature of a cooling water of the vehicle and, if the temperature of the cooling water of the vehicle is outside of a predetermined temperature range for the selected driving force characteristic, selecting a predetermined driving force characteristic;

setting a driving force indication value according to the selected driving force characteristic of the plurality of different driving force characteristics based on mode maps basing the driving force indication value on said accelerator pedal opening degree and said engine driving condition;

displaying a characteristic line for a driving force, representing an acceleration-torque; and displaying a power band based on the accelerator opening degree.

19. The method according to claim 18, wherein said engine driving condition includes an engine rotational speed.

* * * * *